(12) United States Patent
Albrecht et al.

(10) Patent No.: US 10,368,223 B2
(45) Date of Patent: *Jul. 30, 2019

(54) LOW ENERGY AUDIO STREAMING

(71) Applicant: Orion Labs, San Francisco, CA (US)

(72) Inventors: Greg Albrecht, San Francisco, CA (US); Andy Isaacson, San Francisco, CA (US); Ellen Juhlin, San Francisco, CA (US)

(73) Assignee: Orion Labs, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/019,749

(22) Filed: Jun. 27, 2018

(65) Prior Publication Data

US 2018/0310156 A1 Oct. 25, 2018

Related U.S. Application Data

(63) Continuation of application No. 15/479,990, filed on Apr. 5, 2017, now Pat. No. 10,045,186.

(60) Provisional application No. 62/320,026, filed on Apr. 8, 2016.

(51) Int. Cl.
| | |
|---|---|
| *H04W 4/00* | (2018.01) |
| *H04W 4/80* | (2018.01) |
| *H04L 29/06* | (2006.01) |
| *H04W 52/02* | (2009.01) |

(Continued)

(52) U.S. Cl.
CPC .......... *H04W 4/80* (2018.02); *H04L 65/4069* (2013.01); *H04L 65/605* (2013.01); *H04L 65/608* (2013.01); *H04L 67/02* (2013.01); *H04W 4/10* (2013.01); *H04W 52/0209* (2013.01);

(Continued)

(58) Field of Classification Search
CPC ................................ H04W 4/80; H04W 4/008
See application file for complete search history.

(56) References Cited

U.S. PATENT DOCUMENTS

| | | | |
|---|---|---|---|
| 8,125,988 B1* | 2/2012 | Sullivan | H04L 29/0653 370/389 |
| 2004/0114575 A1 | 6/2004 | Morita et al. | |
| 2005/0002525 A1 | 1/2005 | Alkove et al. | |

(Continued)

FOREIGN PATENT DOCUMENTS

| | | |
|---|---|---|
| WO | 2008028175 A2 | 3/2008 |
| WO | 2016027008 A1 | 2/2016 |

*Primary Examiner* — Tuan H Nguyen

(57) ABSTRACT

Systems, methods, software and apparatus enable low energy communication of audio data between an end user device and an associated intermediate communication device. Audio data is transmitted between the end user source device and associated intermediate communication device by cyclical updating and low energy transmission of data values as audio data packet fragments representing the audio data, which are assembled into audio data packets by the associated intermediate communication device. Packaged audio data is transmitted from one intermediate communication device to another intermediate communication device that is associated with an end user sink device. The end user sink device's associated intermediate communication device unpacks and transmits audio data packet fragments to the end user sink device by cyclical updating of and low energy transmission of data values as audio data packet fragments representing the audio data that are converted into acoustic signals.

20 Claims, 6 Drawing Sheets

(51) Int. Cl.
*H04W 4/10* (2009.01)
*H04L 29/08* (2006.01)
(52) U.S. Cl.
CPC ........ *Y02D 70/1262* (2018.01); *Y02D 70/142* (2018.01); *Y02D 70/144* (2018.01); *Y02D 70/26* (2018.01)

(56) References Cited

U.S. PATENT DOCUMENTS

| | | |
|---|---|---|
| 2006/0234744 A1 | 10/2006 | Sung et al. |
| 2006/0268839 A1 | 11/2006 | Kato |
| 2007/0136446 A1 | 6/2007 | Rezvani et al. |
| 2014/0337473 A1 | 11/2014 | Frusina et al. |
| 2015/0042447 A1 | 2/2015 | Vogt et al. |
| 2015/0082337 A1* | 3/2015 | Mamidwar ...... H04N 21/23895 725/31 |

* cited by examiner

Table A

| UUID | Type | Name |
|---|---|---|
| FE00 | Service | Orion |
| A00A | Characteristic, uint8 | AudioTransmitState |
| f2076886-d8f4-4246-8d81-c6b155e9fc80 | Characteristic, byte-array | AudioSource0 (S0) |
| f2076886-d8f4-4246-8d81-c6b155e9fc81 | Characteristic, byte-array | AudioSource1 (S1) |
| f2076886-d8f4-4246-8d81-c6b155e9fc82 | Characteristic, byte-array | AudioSource2 (S2) |
| f2076886-d8f4-4246-8d81-c6b155e9fc83 | Characteristic, byte-array | AudioSource3 (S3) |

| Notif. | Length | Commentary and actions |
|---|---|---|
| S0 | 20 bytes | first fragment of packet A; held for additional (N-1) fragment(s) to complete audio data packet |
| S1 | 10 bytes | second fragment of packet A; assemble with S0 and put on network queue |
| S2 | 20 bytes | first fragment of packet B |
| S3 | 12 bytes | second fragment of packet B; assemble with S2 and queue |
| S0 | 17 bytes | first fragment of packet C |
| S1 | 0 bytes | second fragment of packet C; assemble with S0 and queue |
| XX |  | lost fragment for packet D (e.g., due to BLE transmission interference) |
| S3 | 13 bytes | second fragment of packet D; but first fragment lost; queue "missing packet" indicator |
| S0 | 20 bytes | first fragment of packet E |
| S1 | 17 bytes | second fragment of packet E; assemble with S0 and queue |

Table B

| Packet | Length | Writes | |
|---|---|---|---|
| | | First | Second |
| A | 30 bytes | S0, 20 b | S1, 10 b |
| B | 32 bytes | S2, 20 b | S3, 12 b |
| C | 17 bytes | S0, 17 b | S1, 0 b |
| D | 33 bytes | S2, 20 b | S3, 13 b |

Table C

Table D

| UUID | Type | Name |
|---|---|---|
| FE00 | Service | Orion |
| | Characteristic, uint8 | AudioReceiveState |
| 777445ea-22f0-4254-b206-66aef2ec7540 | Characteristic, byte-array | AudioSink0 (S0) |
| 777445ea-22f0-4254-b206-66aef2ec7541 | Characteristic, byte-array | AudioSink1 (S1) |
| 777445ea-22f0-4254-b206-66aef2ec7542 | Characteristic, byte-array | AudioSink2 (S2) |
| 777445ea-22f0-4254-b206-66aef2ec7543 | Characteristic, byte-array | AudioSink3 (S3) |

*Figure 3*

LOW ENERGY AUDIO STREAMING

RELATED APPLICATIONS

This application is a continuation of U.S. patent application Ser. No. 15/479,990, filed on 5 Apr. 2017, entitled "LOW ENERGY AUDIO STREAMING," which claims the benefit of and priority to U.S. Provisional Patent Application 62/320,026, entitled "LOW ENERGY AUDIO STREAMING," filed 8 Apr. 2016. Each application identified above is incorporated by reference in its entirety (including any appendices thereto) for all purposes.

TECHNICAL FIELD

Aspects of the disclosure are related to communications and, in particular, to end user devices and applications for efficient communications.

TECHNICAL BACKGROUND

Various devices permit the collection and transmission of audio data (e.g., voice and other sounds). In some audio communication systems, an end user communication device (e.g., a wearable, hands-free and/or other highly portable device) allows a user to touch the device and thus communicate using a communication application operating on an intermediate communication device (e.g., a smartphone, computer, gaming device, tablet or other computing device) linked to and associated with the end user device and configured to act as a conduit for communications over a communication network or the like between the associated end user device and other end user devices.

Such portable end user devices can have limited energy sources. As a result, it would be advantageous to utilize communications between end user devices and intermediate communication devices that are energy efficient and thus extend the useful operational life of an energy source in the end user device.

OVERVIEW

Implementations of low energy audio streaming disclosed herein include systems, methods, and software to enable low energy communication of audio data between a portable end user device and an associated communication device using low energy communications (e.g., Bluetooth low energy ("BLE")). Audio data is created (e.g., collected acoustic signals are converted to data using a microphone and a processing system or the like in an end user device referred to as a "source" device) and is transmitted between end user devices (e.g., between an end user "source" device and an end user "sink" device) and their associated intermediate communication devices by cyclically updating and transmitting BLE characteristics that contain data values representing the audio data. BLE characteristics transmitted by an end user source device are sent as audio data packet fragments, which are assembled into audio data packets (e.g., 16 kHz audio packets) by the end user source device's intermediate communication device. Further packaging (and/or other processing) of the transmitted audio data may be performed (e.g., using envelopes and/or chunks), including but not limited to encryption. The finally packaged audio data is transmitted from one intermediate communication device to one or more additional intermediate communication devices, for example using a communication network.

Audio data transmitted over the communication network is received by at least one intermediate communication device that is linked to and/or associated with an end user sink device. The end user sink device's associated intermediate communication device receives the packaged audio data sent by the end user source device's intermediate communication device. The data is unpacked and transmitted to the end user sink device in audio data packet fragments by way of cyclically updated and transmitted BLE characteristics having data values that are converted into acoustic signals (e.g., using a speaker).

This Overview is provided to introduce a selection of concepts in a simplified form that are further described below in the Technical Disclosure. It may be understood that this Overview is not intended to identify or emphasize key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 3 illustrates tables regarding implementations of audio data transmission using BLE low energy communications.

TECHNICAL DISCLOSURE

Figure 1:
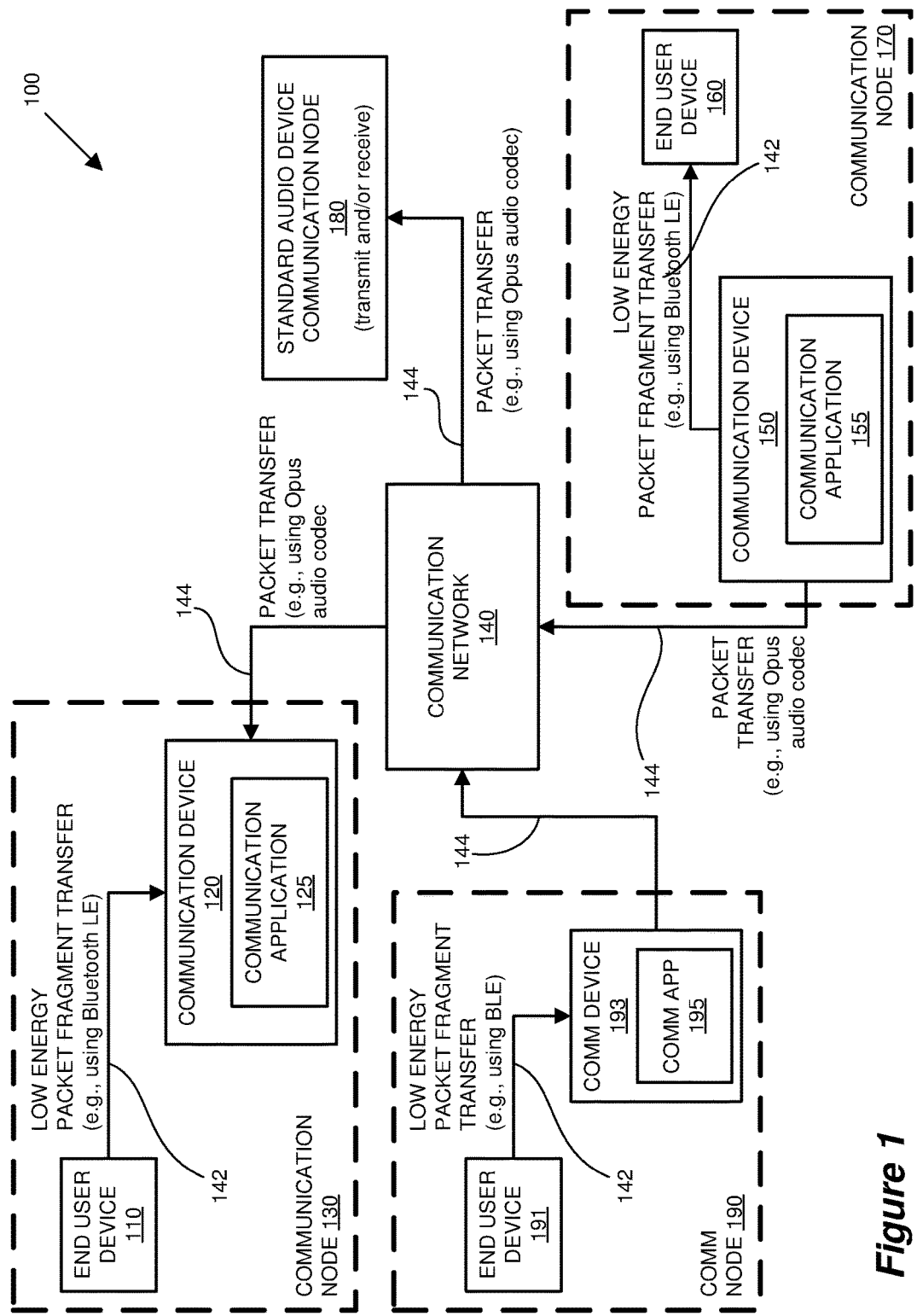
FIG. 1 illustrates one or more exemplary systems configured to facilitate secure communications using low energy communications.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations of low energy audio streaming disclosed and claimed herein provide apparatus, computer readable media, and methods pertaining to utilization of Bluetooth low energy and the like as at least a part of real time transmission of audio data between end user devices. Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Implementations of low energy audio streaming utilize low energy communications between communication nodes that each include an end user device (i.e., an endpoint communication device) and an intermediate communication device (e.g., a smartphone, gaming device, tablet, laptop and/or other type of computer) associated with the endpoint device. The intermediate communication device (ICD) can run a communication application coordinating communications between the paired end user device (EUD) and intermediate communication device (which together can be considered all or part of a communication node). In some implementations audio data is transmitted between the end user device and intermediate communication device using a set of Bluetooth low energy (BLE) characteristics that are cyclically updated and transmitted to or from the end user device, depending upon whether the end user device is receiving or transmitting the audio data, respectively. Audio data can be transmitted between ICDs via a communication network or the like using data packets, envelopes, chunks or other suitable formats and can be encrypted.

Audio data transmitted using the BLE characteristics is packaged in audio data packet fragments for BLE transmission. Audio data packet fragments received by an intermediate communication device from its associated end user device (an end user "source" device) are assembled into audio data packets (e.g., using the Opus audio codec). Further packaging (and/or other processing) of the audio data may occur prior to network transport between intermediate communication devices (e.g., in some implementations a broadcasting ICD may transmit packaged audit data to multiple receiving ICDs via a network). Audio data received by an intermediate communication device can be unpacked and transmitted to its associated end user device (an end user "sink" device) using audio data packet fragments as well (e.g., using BLE). By controlling the timing and/or buffering of the updates (i.e., writing) of the audio data packet fragments generated by or received by the end user devices, audio data can be streamed between such end user devices.

FIG. 1 illustrates an exemplary low energy audio streaming system 100 configured to facilitate, among other things, secure audio communications between endpoint devices on a communications network. System 100 includes communication node 130 (which includes end user device 110 and communication device 120), communication node 170 (which includes end user device 160 and communication device 150), communication node 190 (which includes end user device 191 and communication device 193), standard audio device communication node 180, and communication network 140 to which nodes 130, 170, 180, 190 are linked 144.

Intermediate communication device 120 in communication node 130 communicates with its associated end user device 110 over a low energy communication link 142, and further communicates outside node 130 using communication network 140 over network communication link 144. Communication device 150 in communication node 170 also communicates with its associated end user device 160 using a low energy communication link 142, and further communicates outside node 170 using communication network 140 over network communication link 144. Similarly, communication device 193 in communication node 190 communicates with its associated end user device 192 using a low energy communication link 142, and further communicates outside node 190 using communication network 140 over network communication link 144.

Low energy communication links 142 can be used, as described in more detail herein, to perform low energy packet fragment transfer of audio data to provide audio data streaming between end user devices 110, 160 as endpoint devices and for other purposes (e.g., end user devices can opt to use this low energy communication mode or some other mode in some implementations). A standard audio device in communication node 180 can likewise communicate with intermediate communication devices 120, 150 via communication network 140 using one or more communication network links 144. That is, in some implementations, audio data may be generated using low energy audio streaming in one node and be transmitted to another node that does not utilize low energy audio streaming, and vice versa (audio data may be received in some implementations by a node implementing low energy audio streaming and be thusly transmitted to that receiving node's endpoint device).

The communication link 144 that connects intermediate communication device 120 to communication network 140 can use one or more of Time Division Multiplexing (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof. Link 144 connecting intermediate communication devices 150, 193 to network 140 operates similarly. Communication links 144 each use metal, glass, optical, air, space, or some other material as the transport media and may each be a direct link, or can include intermediate networks, systems (including one or more management service systems), or devices, and can include a logical network link transported over multiple physical links.

Figure 6:
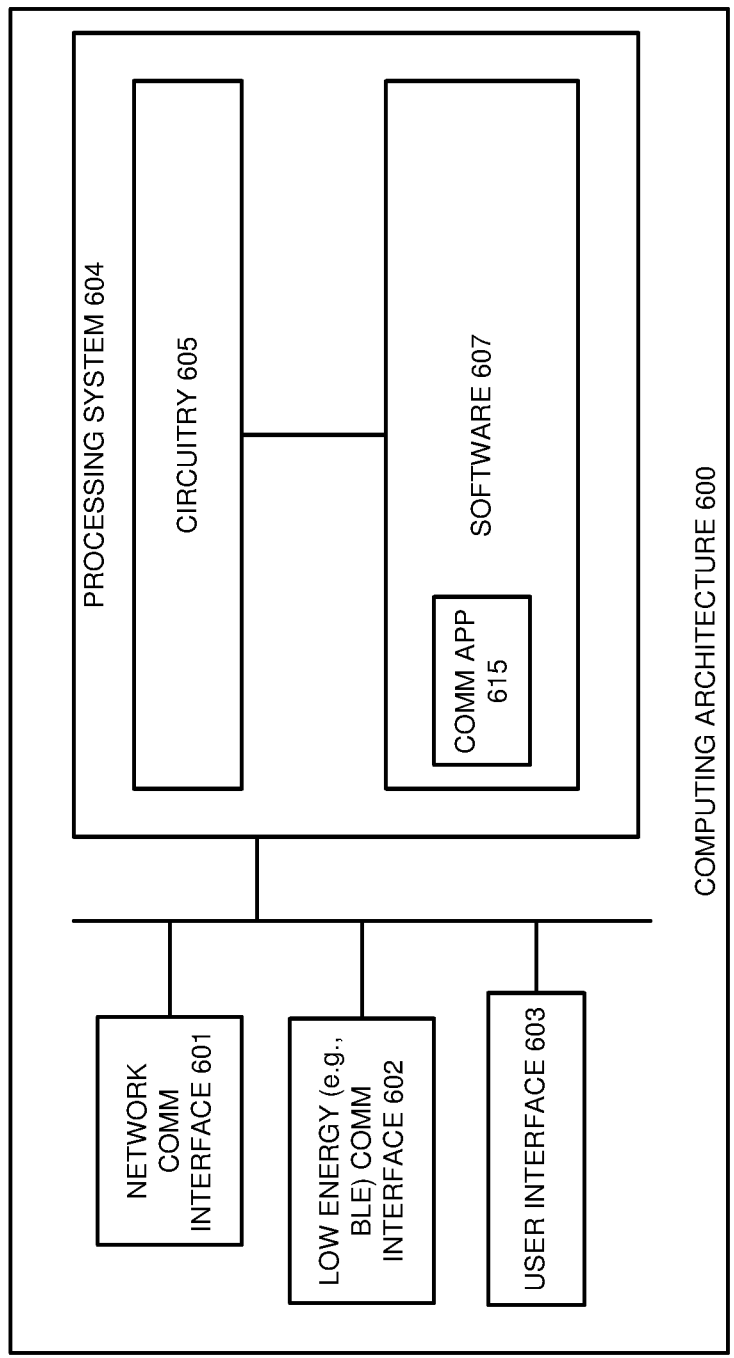
FIG. 6 illustrates a computing architecture to provide group communications via end user devices utilizing low energy audio streaming.

Each intermediate communication device 120, 150, 193 may comprise a smartphone, gaming device, tablet, computer, or some other communication device (any of which can be a computing architecture consistent with FIG. 6) capable of running a communication application and communicating with communication network 140 using the Internet or some other widespread communication network. When transmitting and receiving audio data, communication devices 120, 150, 193 can use an appropriate audio data transfer scheme (e.g., the Opus audio codec and augmented implementations of Opus).

Communication network 140 can comprise a server system utilizing one or more computing devices capable of providing communication services to a plurality of communication nodes and their respective endpoint devices, such as end user devices 110, 160, 191 and a standard audio device in node 180. End user devices 110, 160, 191 may each comprise a speaker, microphone, processing system, communication interface, and a user interface to exchange communications with communication devices 120, 150, 193, respectively, and thus to communication network 140 and other endpoint devices of various types.

The endpoint devices of network 140 include end user devices 110, 160, 191 according to one or more implementations of BLE audio streaming. In some implementations these end user devices can be wearable and operate as push-to-talk (PTT) devices. More specifically, some implementations illustrated in FIG. 1 provide communications over network 140 between end user devices 110, 160, 191 via their paired respective intermediate communication devices 120, 150, 193, in communication nodes 130, 170, 190, respectively. In other non-limiting examples illustrated by FIG. 1, end user device 110 can exchange audio data (transmitting and/or receiving) via communication device 120 and network 140 with a standard audio device (e.g., a device in node 180), irrespective of whether the standard audio device utilizes low energy packet fragment transfer between an end user device and an intermediate communication device as described herein.

In operation, intermediate communication devices 120, 150, 193 can transmit audio data over network links 144 via network 140 using discrete packets containing audio data. For example, in a non-limiting example using the Opus audio codec, audio data packets of 1-40 bytes can be transmitted, where each audio data packet represents 20 milliseconds of audio. A stream consists of a sequence of audio data packets (e.g., denoted as A, B, C, D, E, . . . ) that are transmitted using network 140. A mobile communication application 125, 155, 195 that can operate in the foreground or background on each communication device 120, 150, 193, respectively, is responsible for packing and unpacking audio data transmitted using network 140.

When an end user device 110, 160, 191 sends audio data, the sending device is referred to as a "source" end user device and when an end user device 110, 160, 191 receives audio data, it is referred to as a "sink" end user device. The low energy communication link 142 between each end user device and its respective intermediate communication device can be implemented using Bluetooth low energy, which does not have to have a specific audio data transmission mode and is not necessarily designed to handle Opus and other standard audio data transfer schemes. Instead, in implementations of low energy audio streaming disclosed herein, BLE links are adapted to utilize BLE characteristics, attributes, services, etc. to implement audio data transfer as described herein.

In Bluetooth low energy the Generic Attribute Profile (GATT) is built on top of the Attribute Protocol (ATT), both of which are used for discovering services. GATT establishes common operations and a framework for data transported and stored by the ATT and defines two roles: Server and Client (the ATT defines communication between a BLE Server and Client on a Logical Link Control and Adaptation Protocol). A BLE client sends two types of unsolicited messages to a BLE server—client "commands" (for which no server reply is required), and client "requests" (which require the BLE server to reply by sending a server "response"). A BLE server sends two types of unsolicited messages to a BLE client—"server notifications" (for which no client reply is required), and server "indications" (which require the BLE client to reply by sending a client "confirmation"). BLE links 142 utilizing this communication scheme in some implementations are established and maintained by application 125 in intermediate communication device 120 and similarly by applications 155, 195 in intermediate communication devices 150, 193, respectively.

Figure 2:
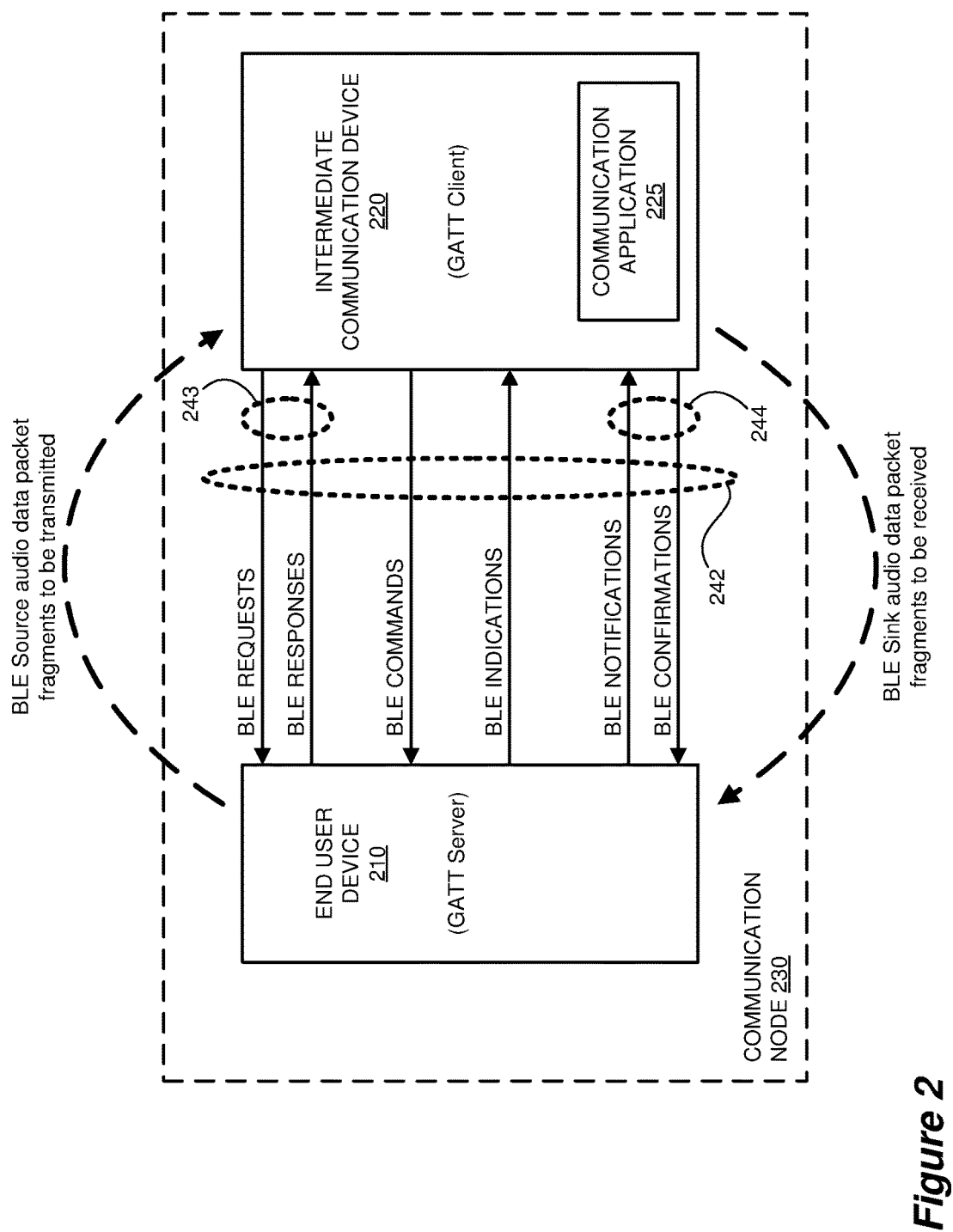
FIG. 2 illustrates one or more communication nodes configured to perform low energy audio data transmission.

In some implementations of audio streaming utilizing BLE, one or more non-limiting examples of which are shown in FIG. 2, an end user device 210 (which can be one of devices 110, 160, 191 of FIG. 1) acts as a GATT server and an intermediate communication device 220 (running communication application 225, which can be one of the applications 125, 155, 195 of FIG. 1) acts as a GATT client, both included in communication node 230 (which can be one of nodes 130, 170, 190 of FIG. 1). In FIG. 2 end user device (GATT server) 210 is linked to intermediate communication device (GATT client) 220 with BLE 242. Thus end user device (GATT server) 210 stores data transported over the ATT and accepts ATT requests, commands and confirmations from intermediate communication device (GATT client) 220. End user device (GATT server) 210 can send indications and notifications asynchronously to intermediate communication device (GATT client) 220 when specified events occur on the end user device (GATT server) 210 (e.g., user-initiated transmission and receipt of audio data), and sends responses to device 220 in reply to requests from device 220. Thus GATT requests and responses 243 are paired, as are GATT notifications and confirmations 244.

GATT also specifies the format of data contained on the GATT server (device 210 in FIG. 2). Attributes are transported by ATT and are formatted as characteristics (e.g., a single data value and descriptors describing the characteristic value, several non-limiting examples of which are shown in Tables A and D in FIG. 3) and services (e.g., a collection of characteristics, such as the "Orion" audio data transfer service(s) of Tables A and D in FIG. 3). In some implementations of low energy audio streaming, endpoint devices such as end user devices 110, 160, 191 can act as GATT servers to implement transmission of audio data to (and through) a connected intermediate communication device (GATT client) 120, 150, 193, respectively, and can also act as GATT servers to implement receipt of audio data from (and through) a connected intermediate communication device (GATT client) as taught herein.

Non-limiting exemplary implementations of system 100 illustrate the transmission of audio data from end user device 110 to end user device 160 in FIG. 1. Thus, in such an example, end user device 110 is an end user "source" device and end user device 160 is an end user "sink" device in such implementations. However, one of the advantages of low energy packet fragment transfer between an end user device (whether a source or sink device) and an intermediate communication device as described herein is that other implementations utilizing low energy packet fragment transfer are possible that do not require all participating endpoint devices to utilize low energy linkage and audio data transfer, as will be appreciated by those skilled in the art (e.g., transmission from an end user device utilizing low energy packet fragment transfer to a standard audio device that does not, and vice versa).

Individual audio packets such as Opus audio codec packets transmittable on communication network 140 using links 144 might not be able to be sent using low energy links 142 like Bluetooth low energy. Where BLE and the like are utilized between an end user source device and an intermediate communication device, the source device allocates data that would be contained in audio data packets to audio data packet fragments, where each and every audio data packet is composed of N audio data fragments throughout operation of the audio data transfer. Thus if every audio data packet is made up of 2 fragments then the fragments are associated as sequenced fragment pairs. Similarly, audio data packets made up of 3 sequenced fragments are then associated as fragment triples and so forth. There are N ordered data fragments in each audio data packet.

In a non-limiting example of system 100 employing BLE as each low energy communication link 142, each audio data packet comprises 2 audio data packet fragments. When a user starts transmitting audio using end user device 110, a "push-to-talk" (PTT) or similar GATT attribute is updated in end user device 110 using BLE (e.g., an AudioTransmitState), as seen in Table A of FIG. 3. The updating of the PTT attribute can be sent from end user device (GATT server) 110 to intermediate communication device (GATT client) 120 as a GATT notification or indication to alert device 120 and application 125 that audio data transmission is commencing, after which a data transmission process utilizing additional GATT characteristics (e.g., 4 characteristics (byte-arrays) designated Source0, Source1, Source2, Source3 or S0, S1, S2, S3) begins. If the exemplary SourceX characteristics are proprietary, user-defined UUIDs may be used for BLE, as seen in Table A of FIG. 3.

Communication application 125 on device 120 in this example subscribes to at least all 5 GATT characteristics (i.e., PTT and the 4 SourceX characteristics) shown in Table A. If each SourceX characteristic holds up to 20 bytes, packets of 1-40 bytes in size can be fragmented as shown in a non-limiting example in Table B of FIG. 3. While audio data is being generated in end user source device 110 in this example, the GATT SourceX attributes are cyclically updated (written) to continually move audio data from the end user source device 110 to its associated intermediate communication device 120. Again, the transmissions from end user source device 110 to intermediate communication device 120 can be sent as BLE indications or BLE notifications (to which intermediate communication device 120 transmits BLE confirmations). When communication application 125 on communication device 120 receives updates to the SourceX characteristics from source end user device 110, application 125 collects paired fragments (in this example, Source0 and Source1 are paired, as are Source2 and Source3) to assemble audio data packets for transmission on communication links 144. For example, upon receiving Source0 and Source1 byte arrays, the two byte arrays are assembled into an audio data packet A. Similarly Source2 and Source3 byte arrays are reassembled into an audio data packet B following the assembly of audio data packet A, where each audio data packet can be an Opus audio codec packet in some implementations. The next two audio data packet fragments are updated Source0 and Source1 byte arrays, which again are assembled, this time into audio data packet C. The notifications and actions performed in assembling audio data packets can follow as shown in Table C of FIG. 3.

As seen in the non-limiting example of Table C of FIG. 3, if the communication application 125 receives an update for Source0 followed by an update for Source2 and then Source3, application 125 recognizes that it lost or failed to receive a fragment (the update for Source1), so application 125 can throw away the Source0 bytes, but keep the bytes in Source2 and Source3. If several fragments are lost in a row, application 125 may for example see Source0 followed Source3 or even Source0 again. Application 125 can make a best estimate of the number of lost fragments and queue the correct number of missing fragment indicators (e.g., 2 or 3). In the unlikely event that 4 fragments are lost, application 125 might see Source0 followed by Source1 and thus be unaware that anything is wrong. Where the Opus audio codec is used, such an event can lead to an audio glitch resulting from a malformed audio data packet consisting of a first fragment of audio data packet A assembled into a packet with the second fragment of audio data packet C, for example. This can result in garbled noise, but will not cause any long-term problem; system 100 will eventually recover after a few packets. Once the audio data packets are assembled, they can be put into envelopes. These packet-filled envelopes are then sent down the transport stream.

End user sink device behavior mirrors that of an end user source device. In one non-limiting example illustrated in FIG. 1, audio data packets in the form of transport envelopes sent via link 144 are received by and unwrapped at intermediate communication device 150 in communication node 170, where communication application 155 is running (again, in the foreground or background). Application 155 updates a PTT attribute in GATT (e.g., in the intermediate communication device and/or in the end user device) and begins streaming packet fragments (e.g., obtained by splitting Opus audio codec audio data packets into fragments) using updates to additional GATT characteristics (e.g., 4 byte-array characteristics designated Sink0, Sink1, Sink2, Sink3 or S0, S1, S2, S3 (again, user-defined UUIDs may be used in BLE definitions of these), as seen in Table D of FIG. 3). Application 155 subscribes to all 5 GATT characteristics in this example. End user device 160 thus receives audio data packet fragments from communication device 150 and renders audio data (assembling paired audio data packet fragments, Sink0 and Sink1, Sink2 and Sink3, for example) that can be broadcast as acoustic signals on end user device 160. Audio data packet fragments can be sent from intermediate communication device (GATT client) 150 to end user sink device (GATT server) 160 using BLE requests, BLE commands and/or BLE confirmations.

If application 155 is managing delivery of audio data packets (e.g., Opus packets) transmitted using a communication protocol (e.g., Hypertext Transfer Protocol Secure transport) prior to being transmitted to end user device 160 using BLE transport, then communication device 150 and/or application 155 must ensure that the BLE transport is not overwhelmed with audio data packets. Therefore, in some implementations a buffer and/or timer can be used to accommodate any potential timing difference(s).

When sending audio data packets over BLE using GATT, the 4 characteristics Sink0, Sink1, Sink2, Sink3 (which can each hold up to 20 bytes, for example) are used. As noted in connection with Table B of FIG. 3, for example, audio data packet A, having a total of 30 bytes of audio data, can be composed of a first fragment of 20 bytes and a second fragment of 10 bytes. Audio data packets B, C and D can likewise be broken down into similar fragment components, as seen in Table B. When receiving audio data packets, a reader can use the S0, S1, S2, S3, S0, S1, S2, S3, S0, S1, S2, S3 . . . sequence to detect packet loss. This requires writing 0-byte values for one or more fragments (e.g., the Source1 fragment of 0 bytes in packet C in Table B of FIG. 3) to avoid mistakenly detecting a lost packet.

Each GATT write can be timed by application 155 so that the GATT write occurs at least a prescribed time interval after the previous GATT write (e.g., a "write interval" of 10 ms). If an operating system wakes up a thread very late (e.g., 100 ms later), then the next 4 GATT attributes can be written in a quick sequence (i.e., with no extra delay between them), but the same attribute is never written twice in the same 10 ms write interval.

When end user device 110 is transmitting audio data in some implementations, communication application 125 of device 120 can send data to its transport stream using an appropriate process (e.g., HTTP 1.1 chunking, which facilitates data transfer when the sender does not necessarily know the length of transmitted content before transmission begins). Where HTTP chunking is used, an HTTP chunk can go out approximately every 100 ms (i.e., 10 packets per second with ~200 bytes of Opus+envelope per HTTP chunk). Bytes can be buffered in application code and then be written to the HTTP class after 100 ms has elapsed.

Alternatively, a buffered stream and .flush( ) process can be used, if the relevant HTTP library exists and can operate accordingly.

In some implementations multiple Opus packets can go into a single HTTP chunked block where the correct envelope byte is present to enable correct packet unwrapping by the receiving communication application 155. Packet construction time management provides advantages in both directions, avoiding data packaging too frequently and avoiding data packaging performed too infrequently. For example, by calling HTTP only 10 times per second rather than a higher rate (e.g., 50 times per second), HTTPS overhead is reduced by amortizing hashing overhead across more useful data bytes. Moreover, this avoids creating new TCP packets too frequently (and thus WiFi/3G/LTE packets too) and avoids excessive CPU load on a server due to processing many smaller packets. Conversely, by calling HTTP at least 10 times per second rather a slower rate (e.g. one time per second, or one time per 4 KB of data), introduction of excessive audio stream delays are avoided while allowing the system to be more responsive to changing network conditions (e.g., by quickly noticing when network delays happen).

The application 155 delivering received audio data packets to an end user device can perform several steps to improve audio data delivery quality. For example, when receiving audio data packets from the network transport, the receiving application can deliver the first packet to BLE as soon as possible, writing it to Sink0/Sink1 (e.g., with a 10 ms write interval in between). Moreover, if more packets are received before the interval is up, those additional packets can be queued. Likewise, if there are no packets in queue when the interval permits processing, the receiving application can wait for additional packets to arrive. If nothing arrives after a prescribed waiting period, then the appropriate status GATT characteristic can be updated and the application cease processing. If there has been a substantial wait and additional audio data packets do arrive, a string of those can be immediately written (e.g., one to each SinkX attribute) before the interval timer is again invoked. By evaluating burst behavior over time (e.g., studying operating system error logs and the like), such behavior might be able to be mitigated.

Figure 4:
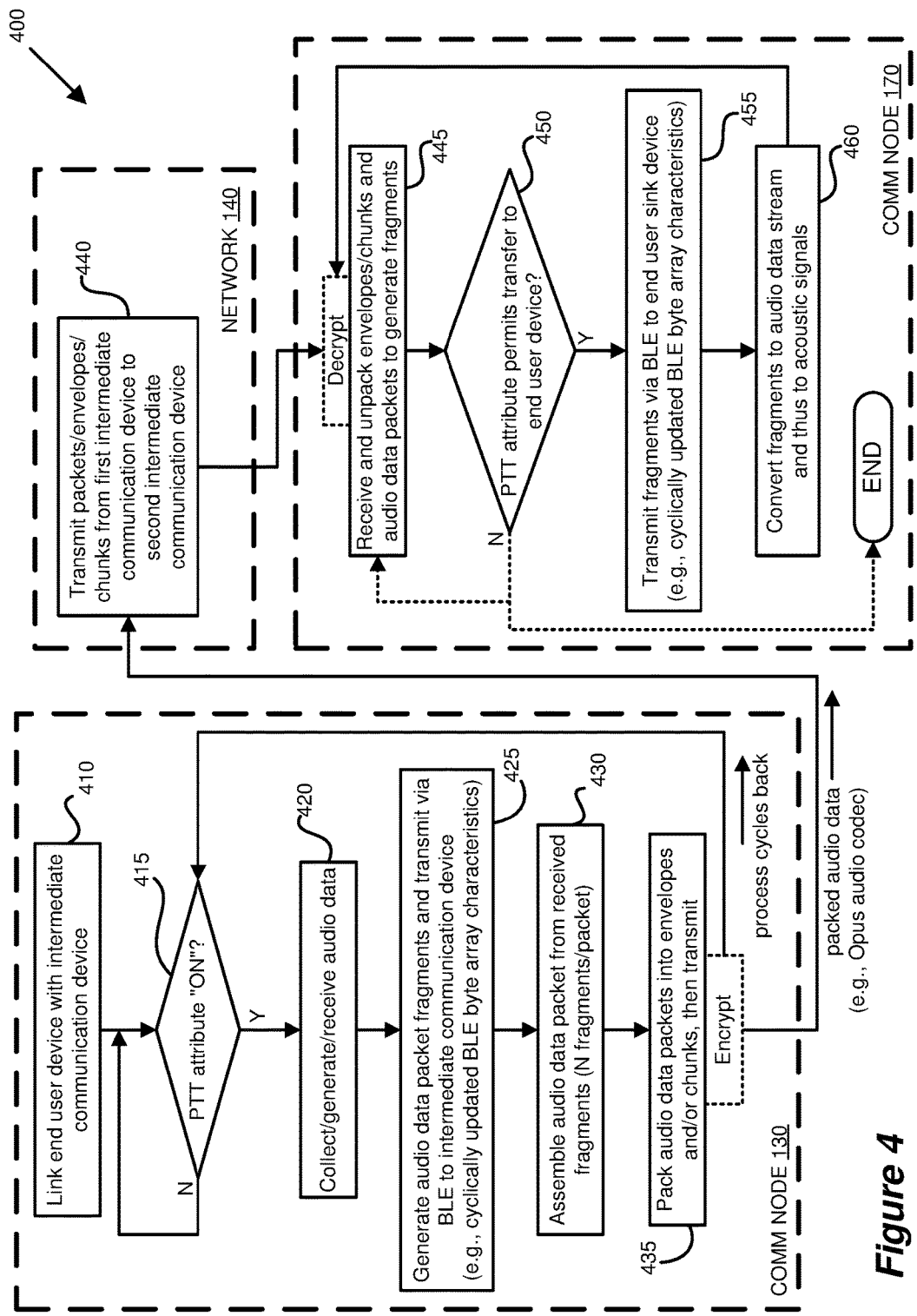
FIG. 4 illustrates one or more methods of operating a communication system.

FIG. 4 illustrates one or more methods of low energy audio streaming between a first end user device and a second end user device. As described in connection with FIGS. 1-3, a communication device may comprise a smartphone, a computer, a tablet, a gaming device, or any other computing device configured to communicate over a communication network and configured to manage or control low energy audio streaming between the communication device and an endpoint device such as an end user device. Rather than using the communication device to communicate with specific groups desired by the user or an organization, in some implementations of low energy audio streaming, each end user device may be used in conjunction with an application on a linked (associated) intermediate communication device to provide the desired communications.

To accomplish low energy audio streaming between such end user devices, audio data is transmitted between each end user device and its associated intermediate communication device using low energy transmission (e.g., Bluetooth low energy) and thence over the communication network using any suitable technology. To begin process 400, a low energy communication channel (e.g., Bluetooth low energy) is established between an end user source device and an intermediate communication device (410) associated with the end user source device. When the PTT attribute is updated to "ON" to start audio streaming (415), the end user source device begins to generate audio data (420), for example by collecting and/or receiving voice and other acoustic signals captured by a microphone in the end user source device and converting acoustic signals to an audio data stream. The audio data stream is then partitioned into and packaged as a plurality of audio data packet fragments that are cyclically updated and transmitted (430) to the intermediate communication device associated with the end user source device using a low energy communication link such as BLE (425). The associated intermediate communication device then generates audio data packets (430) by assembling received audio data packet fragments into audio data packets, where each audio data packet is made of N packet fragments. As noted in FIG. 4 the audio data packet fragments can be BLE byte-array characteristics that are cyclically updated and transmitted from the end user source device (e.g., as a GATT server) to its associated intermediate communication device using BLE notifications, indications and/or responses. This cyclical attribute updating and transmission from end user source device to intermediate communication device continues until the PTT attribute is switched "OFF." The assembled audio data packets can then be further assembled into envelopes and/or chunks (435). Such further data packaging can include encrypting the assembled data as well. After step 435, the end user source device processing of audio data continues by returning to check that the PTT attribute is still "ON," while the packaged audio data is sent on for transmission on the network transport. Steps 410 through 435 can be performed within a communication node such as node 130 of FIG. 1.

The assembled packets, envelopes and/or chunks are then transmitted (440) from the intermediate communication device associated with the end user source device to another intermediate communication device associated with an end user sink device (e.g., using a communication network such as network 140 of FIG. 1). This second intermediate communication device unpacks the received data to generate audio data packet fragments (445). These generated fragments can be identical to the audio data packet fragments generated by the end user source device or can be a different fragment format. If an appropriate BLE attribute (e.g., PTT) permits transfer of the audio data to the associated end user device (450), then audio data is forwarded from the second intermediate communication device to its associated end user sink device. Again, in some implementations the audio data packet fragments can be audio data packet fragments can be BLE byte-array characteristics that are cyclically updated and transmitted (455) to the end user sink device (e.g., as a GATT client) from its associated intermediate communication device using BLE requests, commands and/or confirmations. The audio data packet fragments are then converted back into acoustic signals (460) by the end user sink device. As noted the transmission of audio data packets, envelopes and/or chunks can be performed according to the Opus audio codec or any other suitable protocol, technology, etc. The unpacking and BLE transmission of audio data packet fragments continues until transmission is halted (e.g., by switching the appropriate PTT attribute (460) and/or in some other way).

Figure 5:
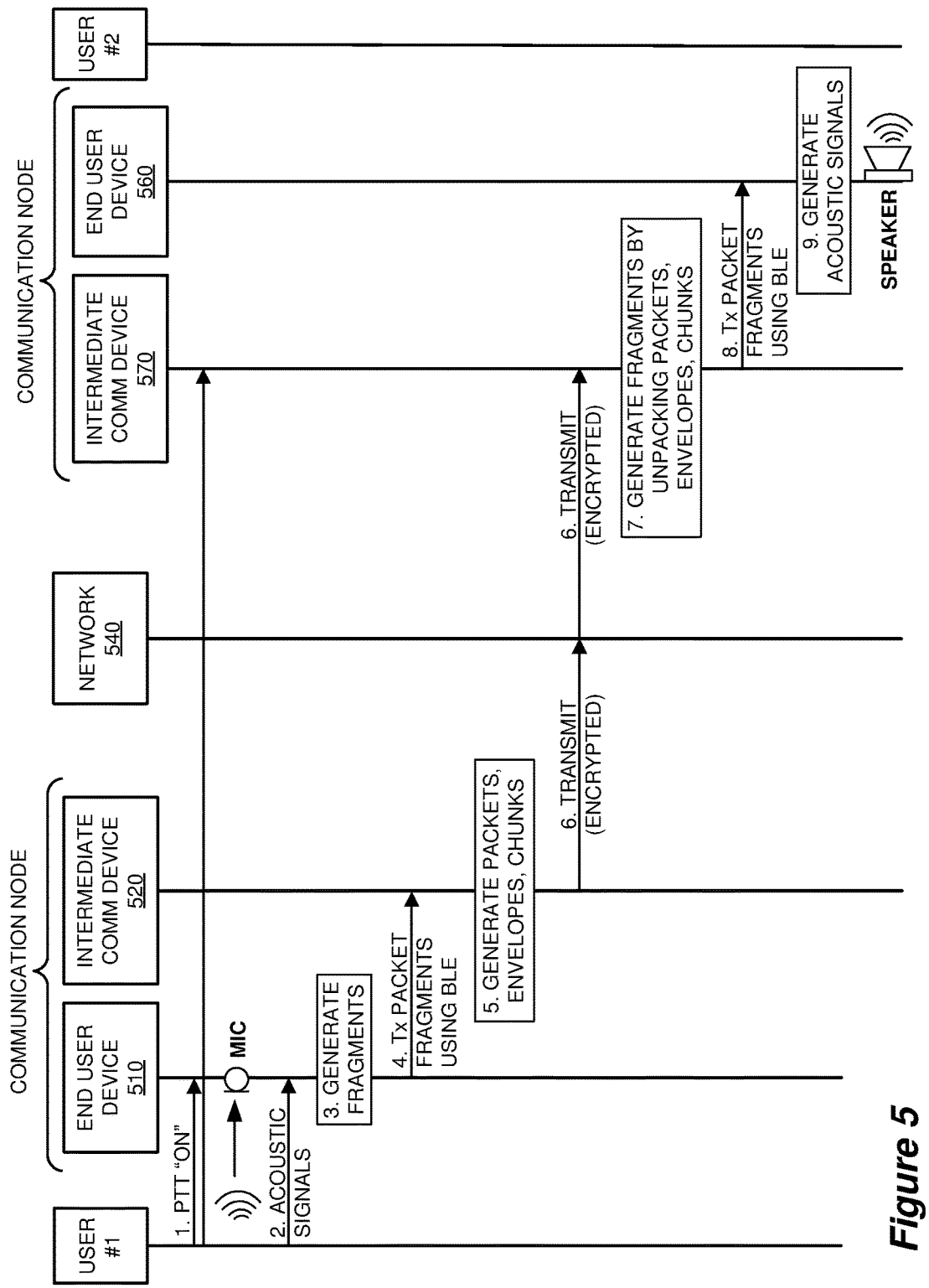
FIG. 5 illustrates a sequence diagram depicting example communication between multiple communication nodes utilizing audio data transmission using BLE low energy communications.

FIG. 5 illustrates a sequence diagram depicting exemplary communication between multiple communication nodes that are connected via a communication network such as network 140 of FIG. 1. Specifically, the exemplary process of FIG. 5 depicts use of Bluetooth low energy linking of end user devices to intermediate communication devices for streaming audio data.

To begin, a low energy communication channel (e.g., a BLE channel) is established between the end user source device 510 and its associated intermediate communication device 520. Device 520 may be running an application or the like that implements, manages and/or in some other way controls low energy communications between device 510 and device 520 using the low energy channel. At step 1 the end user #1 switches on the audio streaming function (e.g., using a push-to-talk (PTT) selection) which can be transmitted to various devices in the communication system (e.g., both end user devices 510, 560 and both intermediate communication devices 520, 570). Acoustic signals are generated by user #1 at step 2 and these acoustic signals can be collected by a microphone in end user device 510 and converted into audio data that is then packaged in audio data packet fragments in step 3. The audio data packet fragments are transmitted from end user source device 510 to intermediate communication device 520 at step 4 where the fragments are used to generate audio data packets and possibly audio data envelopes and/or chunks in some implementations. The audio data may also be encrypted at an appropriate stage in the packaging process(es).

At step 6 the packaged audio data is transmitted via a network 540 to a second intermediate communication device 570 in a separate communication node. It should be borne in mind that packaged audio data in some implementations may be transmitted via network 540 to multiple communication nodes and users using low energy audio streaming Audio data packet fragments are generated at step 7 within intermediate communication device 570 and then transmitted at step 8 to the end user sink device 560. Device 560 generates acoustic signals at step 9 that can then be broadcast to user #2. The packing and unpacking of audio data into and out of audio data packet fragments and other data structures (e.g., audio data packets, envelopes, chunks) can continue on a cyclical basis by having byte array BLE characteristics updated and written in sequence. BLE requests, responses, commands, indications, notifications and/or confirmations may be used to transmit data held in BLE characteristics between various paired devices (i.e., an end user device and its associated intermediate communication device).

FIG. 6 illustrates a computing architecture 600 to implement the communication systems, devices, apparatus and processes in FIGS. 1-5. Computing architecture 600 is representative of a computing architecture that may be employed as any computing apparatus, system, or device, or collections thereof, to suitably implement one or more of the systems, devices, apparatus and processes in FIGS. 1-5 (including, but not limited to, end user devices, intermediate communication devices, communication network components and systems, etc.). Computing architecture 600 comprises network communication interface 601, low energy communication interface 602, user interface 603, and processing system 604. Processing system 604 is communicatively linked to communication interfaces 601, 602 and user interface 603. Processing system 604 includes processing circuitry 605 and memory device 606 that stores operating software 607 (including communication application 615, which may be the same or similar to application(s) 125, 155, 195, 225 and/or may be configured to perform the same or similar processes as shown in FIG. 4).

Network communication interface 601 comprises components that communicate over network and related communication links (e.g., including those extending outside a communication node), such as network cards, ports, RF transceivers, processing circuitry and software, or some other communication devices. Network communication interface 601 may be configured to communicate over metallic, wireless, or optical links. Network communication interface 601 also may be configured to use TDM, IP, Ethernet, optical networking, wireless protocols, communication signaling, or some other communication format— including combinations thereof. Low energy communication interface 602 comprises components that communicate using a low energy channel, such as Bluetooth low energy. User interface 603 comprises components that permit user interaction with computing architecture 600. User interface 603 can include a keyboard, display screen, mouse, touch pad, or some other user input/output apparatus. User interface 603 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus (e.g., a non-transitory computer readable storage medium having a communication application stored thereon that is configured to operate as described herein). Operating software 607 comprises computer programs, firmware, or some other form of machine-readable processing instructions. Operating software 607 may include any number of software modules to provide the communication operations described herein. Operating software 607 may further include an operating system, utilities, drivers, network interfaces, applications, or some other type of software. When executed by circuitry 605, operating software 607 directs processing system 604 to operate computing architecture 600 as described herein to provide low energy audio streaming and other communications.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of transmitting audio data, the method comprising:
   a first communication device receiving over a low energy wireless communication link a plurality of audio data packet fragments from a second communication device, wherein each audio data packet fragment comprises audio data collected from an audio data stream;
   the first communication device generating a plurality of audio data packets by assembling the received plurality of audio data packet fragments, wherein each audio data packet comprises a plurality of audio data packet fragments; and
   the first communication device transmitting the plurality of audio data packets via a communication network.

2. The method of claim 1 wherein the low energy wireless communication link comprises a Bluetooth low energy (BLE) communication link.

3. The method of claim 2 wherein the plurality of audio data packet fragments received from the second communication device comprises a plurality of BLE characteristics.

4. The method of claim 2 wherein the second communication device utilizes a push-to-talk audio transmission attribute.

5. The method of claim 2 further comprising the second communication device updating a BLE status characteristic prior to transmitting the plurality of audio data packet fragments to the first communication device.

6. The method of claim 1 further comprising encrypting the plurality of audio data packets prior to transmission via the communication network.

7. The method of claim 1 wherein the audio data packets are Opus audio codec packets and further wherein each Opus audio codec packet includes two or more audio data packet fragments.

8. The method of claim 1 wherein transmitting the assembled plurality of audio data packets via the communication network comprises the first communication device generating HTTP chunks comprised of portions of the plurality of audio data packets.

9. The method of claim 1 wherein the first communication device comprises one of the following:
   a smartphone;
   a gaming device;
   a tablet; or
   a laptop.

10. A non-transitory computer readable storage medium having a low energy audio streaming communication application stored thereon, the low energy audio streaming communication application including instructions, which when executed by one or more processors of a first communication device, cause the first communication device to:
   receive over a low energy wireless communication link a plurality of audio data packet fragments from a second communication device, wherein each audio data packet fragment comprises audio data collected from an audio data stream;
   generate a plurality of audio data packets by assembling the received plurality of audio data packet fragments, wherein each audio data packet comprises a plurality of audio data packet fragments; and
   transmit the plurality of audio data packets via a communication network.

11. The non-transitory computer readable storage medium of claim 10 wherein the low energy wireless communication link comprises a Bluetooth low energy (BLE) communication link.

12. The non-transitory computer readable storage medium of claim 11 wherein the plurality of audio data packet fragments received from the second communication device comprises a plurality of BLE characteristics.

13. The non-transitory computer readable storage medium of claim 11 wherein the second communication device utilizes a push-to-talk audio transmission attribute.

14. The non-transitory computer readable storage medium of claim 11 wherein the second communication device updates a BLE status characteristic prior to transmitting the plurality of audio data packet fragments to the first communication device.

15. The non-transitory computer readable storage medium of claim 10 wherein the audio data packets are Opus audio codec packets and further wherein each Opus audio codec packet includes two or more audio data packet fragments.

16. The non-transitory computer readable storage medium of claim 15 wherein transmission of the assembled plurality of audio data packets via the communication network comprises the first communication device generating HTTP chunks comprised of portions of the plurality of audio data packets.

17. The non-transitory computer readable storage medium of claim 10 further including instructions, which when executed by one or more processors of the first communication device, cause the first communication device to encrypt the plurality of audio data packets prior to transmission via the communication network.

18. The non-transitory computer readable storage medium of claim 10 wherein the first communication device comprises one of the following:
   a smartphone;
   a gaming device;
   a tablet; or
   a laptop.

19. A method of transmitting audio data, the method comprising:
   a first communication device receiving a plurality of audio data packets via a communication network;
   the first communication device generating a plurality of audio data packet fragments from the received plurality of audio data packets, wherein each audio data packet comprises a plurality of audio data packet fragments; and
   the first communication device transmitting over a low energy wireless communication link the plurality of audio data packet fragments to a second communication device, wherein the second communication device generates an audio data stream from the transmitted plurality of audio data packet fragments.

20. The method of claim 19 wherein the low energy wireless communication link comprises a Bluetooth low energy (BLE) communication link.

* * * * *